United States Patent
Deng

(10) Patent No.: US 10,193,298 B2
(45) Date of Patent: Jan. 29, 2019

(54) HIGH GAIN OPTICALLY PUMPED FAR INFRARED LASER

(71) Applicant: TAE TECHNOLOGIES, INC., Foothill Ranch, CA (US)

(72) Inventor: Bihe Deng, Rancho Santa Margarita, CA (US)

(73) Assignee: TAE TECHNOLOGIES, INC., Foothill Ranch, CA (US)

( * ) Notice: Subject to any disclaimer, the term of this patent is extended or adjusted under 35 U.S.C. 154(b) by 1236 days.

(21) Appl. No.: 14/586,714

(22) Filed: Dec. 30, 2014

(65) Prior Publication Data

US 2018/0254598 A1 Sep. 6, 2018

Related U.S. Application Data

(60) Provisional application No. 62/006,625, filed on Jun. 2, 2014, provisional application No. 61/921,956, filed on Dec. 30, 2013.

(51) Int. Cl.
| | | |
|---|---|---|
| *H01S 3/09* | (2006.01) | |
| *H01S 3/094* | (2006.01) | |
| *H01S 3/03* | (2006.01) | |
| *H01S 3/08* | (2006.01) | |
| *H01S 3/223* | (2006.01) | |

(52) U.S. Cl.
CPC ...... *H01S 3/094003* (2013.01); *H01S 3/0315* (2013.01); *H01S 3/08068* (2013.01); *H01S 3/2232* (2013.01)

(58) Field of Classification Search
CPC . H01S 3/03; H01S 3/0315; H01S 3/08; H01S 3/094003; H01S 3/08068; H01S 3/2232
See application file for complete search history.

(56) References Cited

PUBLICATIONS

Bergerson, W. F., et al., "Far-infrared polarimetry diagnostic for measurement of internal magnetic field dynamics and fluctuations in the C-MOD Tokamak (invited)$^{a)}$", Review of Scientific Instruments, 2012, vol. 83, pp. 10E316-1-10E316-6.

Chang, T. Y., et al., "Optically Pumped Submillimeter-Wave Sources", IEEE Transactions on Microwave Theory and Techniques, 1974, vol. MTT-22, No. 12, pp. 983-988.

Danielewicz, E.J., et al., "Hybrid Output Mirror for Optically Pumped Far Infrared Lasers", Optics Communications, 1975, vol. 13, No. 4, pp. 366-369.

Deng, B. H., et al.,"Development of a multichannel far-infrared tangential interferometer/polarimeter for the National Spherical Torus Experiment", Review of Scientific Instruments, 2003, vol. 74, No. 3, pp. 1617-1620.

Deng, B. H., et al.,"High-speed three-wave polarimeter-interferometer diagnostic for Madison symmetric torus", Review of Scientific Instruments, 2006, vol. 77, pp. 10F108-1-10F108-4.

Dyubko, S. F., et al., "Investigation of submillimeter-wave amplification in optically pumped molecular gases", Soy. J. Quantum Electron., 1977, vol. 7, No. 7, pp. 859-862.

(Continued)

*Primary Examiner* — Armando Rodriguez
(74) *Attorney, Agent, or Firm* — Kenneth S. Roberts

(57) ABSTRACT

A new optically pumped far infrared (FIR) laser with separate pump beam reflector and FIR output coupler is developed. The configuration of the new FIR laser greatly simplifies the tuning of the laser and enables the optimization of the pump beam absorption without affecting the laser alignment.

11 Claims, 3 Drawing Sheets

(56) References Cited

PUBLICATIONS

Erickson, R. M., "Far-Infrared Polarimetry/Interferometry for Polodial Magnetic Field Measurement on ZT-40M", Thesis, Los Alamos National Laboratory, Jun. 1986, pp. 1-212.

Fesenko, L. D., et al., "Optimization of the parameters of optically pumped submillimeter lasers", Soy. J. Quantum Electron., 1976, vol. 3, No. 7, pp. 839-843.

Lehecka, T., et al., "High-power, twin-frequency FIR lasers for plasma diagnostic applications", Rev. Sci. Instrum., 1986, vol. 57, No. 8, pp. 1986-1988.

Luhmann, Jr., N. C., et al., "Instrumentation for magnetically confined fusion plasma diagnostics", Rev. Sci. Instrum., 1984, vol. 55, No. 3, pp. 279-331.

Manley, J. M., et al., "Some General Properties of Nonlinear Elements—Part I. General Energy Relations", Proceedings of the IRE, 1956, pp. 904-913.

Mansfield, D. K., et al., "Enhanced, High Power Operation of the 119μm Line of Optically Pumped $CH_3OH$", International Journal of Infrared and Millimeter Waves, 1985, vol. 6, No. 9, pp. 867-876.

Mansfield, D. K., et al., "Multichannel far-infrared laser interferometer for electron density measurements on the tokamak fusion test reactor", Applied Optics, 1987, vol. 26, No. 20, pp. 4469-4474.

Marcatili, E. A. J., et al., "Hollow Metallic and Dielectric Waveguides for Long Distance Optical Transmission and Lasers", 1964, The Bell System Technical Journal, pp. 1783-1809.

Naftaly, M., et al., "THz Transmission in Polymer Materials—a Data Library", Conference: Infrared and Millimeter Waves, 2007, pp. 19-20.

Rommers, J H, et al., "A new scheme for heterodyne polarimetry with high temporal resolution", Plasma Phys. Control. Fusion, 1996, vol. 38, pp. 1805-1816.

Ulrich, R., et al., "Variable Metal Mesh Coupler for Far Infrared Lasers", Applied Optics, 1970, vol. 9, No. 11, pp. 2511-2516.

Véron, D., "Submillimeter Interferometry of High-Density Plasmas", Infrared and Millimeter Waves, vol. 2, Chapter 2, 1979, pp. 67-135.

Whitbourn, L. B., et al., "An Experimental Study of a CW Optically Pumped Far Infrared Formic Acid Vapour Laser", Infrared Physics, 1988, vol. 28, No. 1, pp. 7-20.

Williams, B. S., "Terahertz quantum-cascade lasers", Nature Photonics, 2007, vol. 1, No. 9, pp. 517-525.

HIGH GAIN OPTICALLY PUMPED FAR INFRARED LASER

CROSS REFERENCE TO RELATED APPLICATION

This application claims the benefit of U.S. Provisional Application No. 62/006,625, filed Jun. 2, 2014, and U.S. Provisional Application No. 61/921,956, filed Dec. 30, 2013, which applications are incorporated by reference.

FIELD

The embodiments described herein generally relate to a far infrared (FIR) laser and more particularly, to systems and methods providing a high gain optically pumped FIR laser.

BACKGROUND INFORMATION

Optically pumped far infrared (FIR) gas lasers are most widely used in interferometers and polarimeters for plasma diagnostics. The long wavelength of these lasers means large phase signals to be detected and insensitiveness to mechanical vibrations [1, 2]. High gain and high FIR laser output power is required so that the laser beam can be split into multiple beams for simultaneous multi-channel measurements. A typical FIR laser resonator consists of a flat mirror, a dielectric waveguide, and an output coupler, as shown in FIG. 1. The resonator is filled with molecular gas chosen based on the desired output laser wavelength. The molecules are excited to the higher vibrational energy level by absorbing infrared pump laser photons. The transition to a lower rotational energy sub-level within the same vibrational energy level branch results in the longer wavelength FIR laser output. CO2 lasers are most frequently used as the pump source due to their high power and richness in wavelength which can be tuned to match the resonant absorption of various working gas molecules. The flat mirror is coated to have near unity reflection coefficient and has a small hole (usually off center, 3-5 mm in diameter) for pump laser beam injection. It is sometimes referred to as the rear mirror as it is at the opposite side of the output coupler, where the FIR laser beam exits. The output coupler has finite transmission (coupling) coefficient so that laser power can be coupled out. This is the most critical component of FIR lasers, as it will determine the gain, output power, and output laser beam quality of the lasers, as well as how conveniently one can operate the laser. The embodiments described herein include an innovative design that achieved the highest gain and laser output power when working with the formic acid (HCOOH) vapor and a FIR wavelength of 433 μm, at the mean time significantly improved the flexibility in terms of laser tuning and operation. The laser embodiments can be easily adapted to operate at other FIR laser wavelengths.

For optically pumped FIR lasers as shown in FIG. 1, many works have been published on various output couplers, which are critical in determining the laser gain, power, and output beam quality. The simplest output coupler is a mirror with a small clear hole at the center. The pump laser beam will leak through the hole leading to reduced FIR laser gain and power. A hybrid hole output coupler, as show in FIG. 2(a), prevents the pump beam leakage by coating the hole with dielectric layers which have high reflectivity for the pump laser wavelength. The dielectric layer is thin comparing to the FIR wavelengths, showing negligible reflection. High resistivity silicon or germanium is used as the substrate material for the dielectric and annular gold coatings. These hybrid hole couplers can achieve higher FIR laser power [10, 11], but have the disadvantages of fast beam divergence and unstable transverse mode quality. Silicon substrate metal mesh-dielectric hybrid couplers, as shown in FIG. 2(b) [12], yield much better output beam quality, but are narrow band and lack the flexibility for tuning the coupling coefficient. An improved Fabry-Pérot coupler [13], as shown in FIG. 2(c), comprises a quartz étalon and metal mesh can be optimized by tuning the spacing between the quartz plate and the mesh. However, it is enclosed inside the vacuum chamber, making it very inconvenient for optical alignment and laser tuning.

The above mentioned output couplers also commonly serve as the reflector for the CO2 pump laser beam. Due to the finite length of the FIR laser cavity, the absorption of the pump laser requires multiple passes. For example, the absorption coefficient of the 9R20 line of CO2 laser in the formic acid (HCOOH) vapor with a pressure of ~400 mTorr is 0.36 $m^{-1}$ [14], and four (4) passes are required to absorb 90% of the pump power in a FIR cavity length of 1.5 m. As the pump laser is usually injected via an off-axis hole in the rear mirror, the normal of the pump beam reflector needs to be at a small angle with respect to the waveguide axis for optimum excitation. On the other hand, FIR laser alignment requires that the reflecting surface of the output couplers be perpendicular to the waveguide axis. The excitation of the laser is compromised by the FIR laser alignment as a result.

In light of the foregoing, it is, therefore, desirable to provide an improved optically pumped FIR laser.

SUMMARY

The embodiments provided herein are directed to a new optically pumped far infrared (FIR) laser with a separate pump beam reflector and FIR output coupler. This configuration of the new FIR greatly simplifies the tuning of the laser and enables the optimization of the pump beam absorption without affecting the laser alignment.

In one embodiment, a FIR laser comprises a vacuum chamber, a beam pump source coupled to the chamber, a rear mirror with an off center hole and a waveguide housed in the chamber, a pump beam reflector coupled to the chamber opposite the rear mirror, a vacuum window coupled to the chamber adjacent the rear mirror, and an output coupler positioned external to the chamber. In one embodiment, the beam output from the pump source is split into two beams to pump two identical FIR lasers The pump beam reflector and the output coupler are separate components. The pump beam reflector is preferably configured as a dichroic mirror and positioned on an output end of the chamber separated from the output coupler. Both the rear mirror and the dichroic mirror are mounted to the ends of first and second bellows on opposite ends of the chamber to allow angle adjustments. The output coupler is movable to enable the cavity length to be adjusted for resonance, and for controlling the beat frequency between the two FIR lasers. The adjustment of the dichroic mirror optimizes the pump beam absorption without compromising the FIR alignment. The dichroic mirror is also used as the vacuum window on the output end of the chamber.

The output coupler comprises a parallel mesh Fabry-Pérot. As noted above, it is installed outside the vacuum boundary of a chamber, making it very convenient to tune and align the laser.

The systems, methods, features and advantages of the invention will be or will become apparent to one with skill in the art upon examination of the following figures and detailed description. It is intended that all such additional methods, features and advantages be included within this description, be within the scope of the invention, and be protected by the accompanying claims. It is also intended that the invention is not limited to require the details of the example embodiments.

BRIEF DESCRIPTION OF THE FIGURES

The accompanying drawings, which are included as part of the present specification, illustrate the presently preferred embodiment and, together with the general description given above and the detailed description of the preferred embodiment given below, serve to explain and teach the principles of the present invention.

Figure 1:
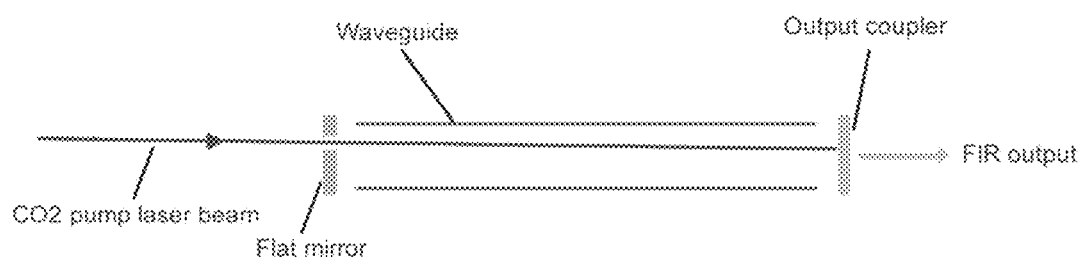
FIG. 1 is a schematic of a typical optically pumped FIR laser resonator.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not necessarily describe every aspect of the teachings disclosed herein and do not limit the scope of the claims.

DESCRIPTION

The embodiments provided herein are directed to a new optically pumped far infrared (FIR) laser with separate pump beam reflector and FIR output coupler. This configuration of the new FIR greatly simplifies the tuning of the laser and enables the optimization of the pump beam absorption without affecting the laser alignment.

In one embodiment, the new optically pumped FIR laser comprises a vacuum chamber, a beam pump source coupled to the chamber, a rear mirror with an off center hole and a waveguide housed in the chamber, a pump beam reflector coupled to the chamber opposite the rear mirror, a vacuum window coupled to the chamber adjacent the rear mirror, and an output coupler positioned external to the chamber. In one embodiment, the beam output from the pump source is split into two beams to pump two identical FIR lasers The pump beam reflector and the output coupler are separate components. The pump beam reflector is preferably configured as a dichroic mirror and positioned on an output end of the chamber separated from the output coupler. Both the rear mirror and the dichroic mirror are mounted to the ends of first and second bellows on opposite ends of the chamber to allow angle adjustments. The output coupler is movable to enable the cavity length to be adjusted for resonance, and for controlling the beat frequency between the two FIR lasers. The adjustment of the dichroic mirror optimizes the pump beam absorption without compromising the FIR alignment. The dichroic mirror is also used as the vacuum window on the output end of the chamber.

The output coupler comprises a parallel mesh Fabry-Pérot. As noted above, it is installed outside the vacuum boundary of a chamber, making it very convenient to tune and align the laser.

Figure 3:
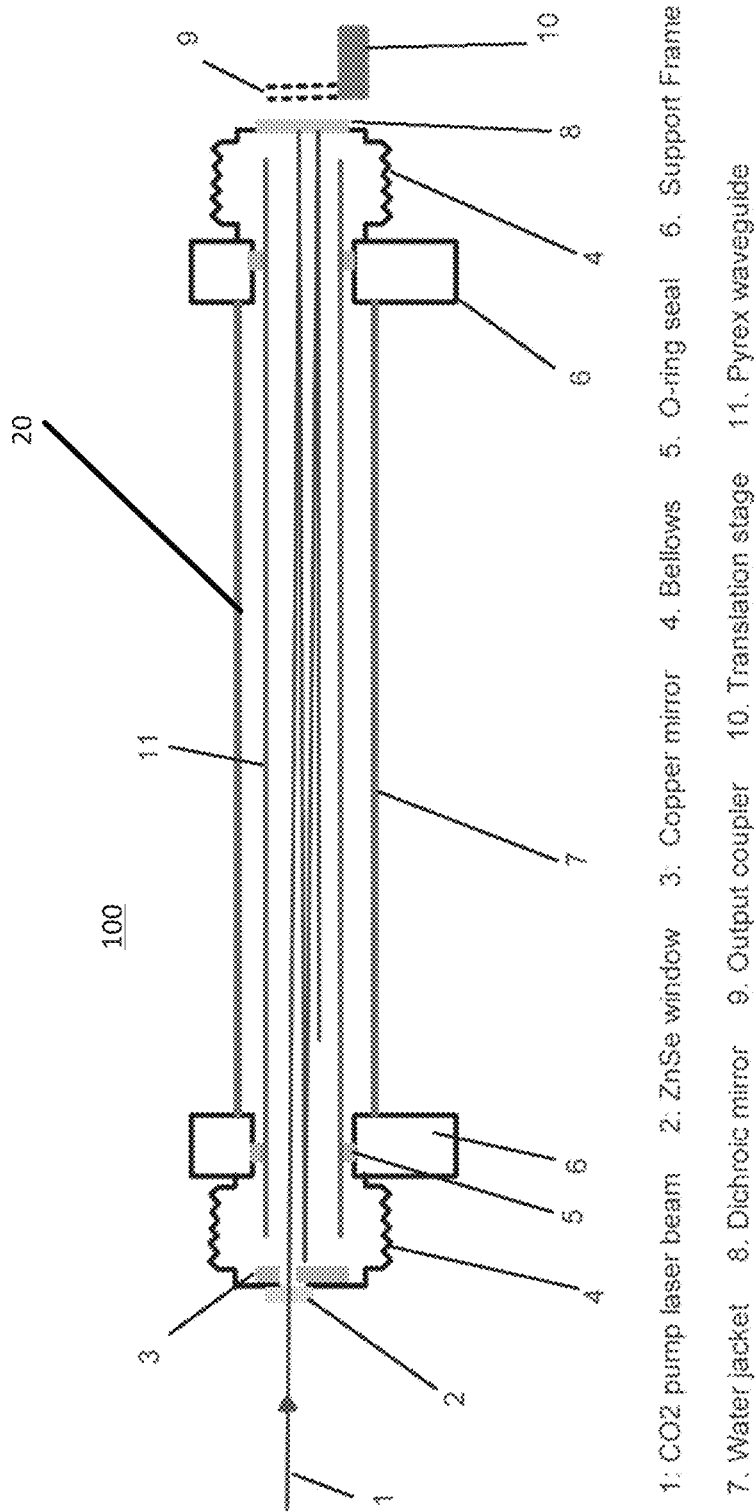
FIG. 3 is a schematic of an optically pumped FIR laser of the present invention.

Turning to the figures a schematic of the new FIR laser 100 is shown in FIG. 3. The FIR laser 100 includes a chamber 20 housing a rear mirror 3 with an off center hole and a waveguide 11, and an output coupler 9 external to the chamber 20. The FIR laser 100 includes support frames 6 with holes and connectors for the working gas and cooling water flows. In a working example embodiment, the waveguide 11 is a 1.52 m long Pyrex tube with 38 mm inside diameter. Also in the working example, the rear mirror 3 is a 50 mm diameter gold-coated copper mirror with a 4 mm hole for the pump laser beam injection. The hole in the rear mirror 3 is 8 mm off center. The offset from center is a compromise between the minimization of the FIR cavity loss and the maximization of the overlap of the FIR laser cavity mode volume and the pump beam path.

Figure 4:
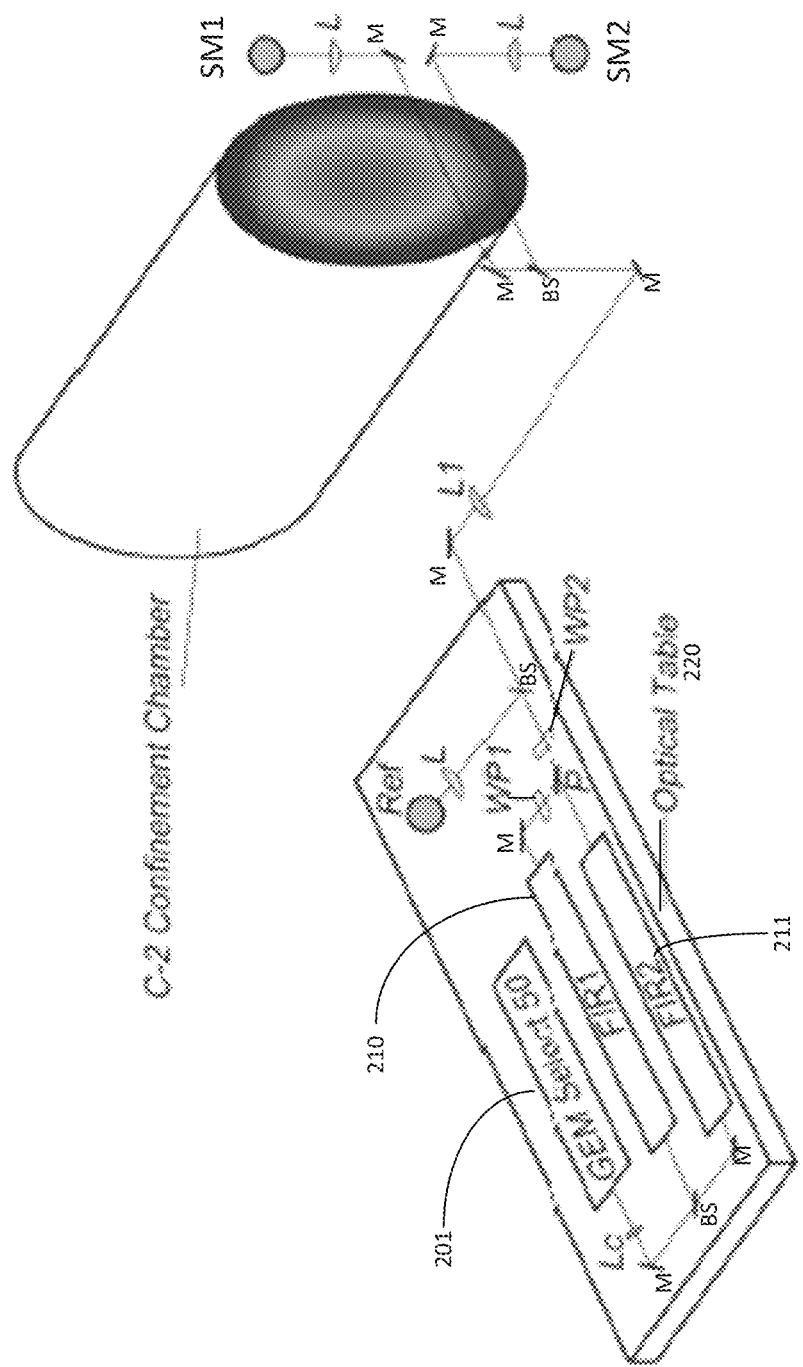
FIG. 4 is a schematic of an example diagnostic system setup utilizing the optically pumped FIR laser.

A pump source 1 coupled to the chamber 20 is preferably split into two beams to pump two identical FIR lasers (see FIG. 4; the second FIR laser is not shown FIG. 3). In a working example, the pump source is a GEM Select-50 Coherent CO2 laser grating tuned to the 9R20 line with CW output power of about 58 W and each FIR laser 100 is filled with formic acid (HCOOH) vapor to produce a 433 μm wavelength radiation.

Figure 2:
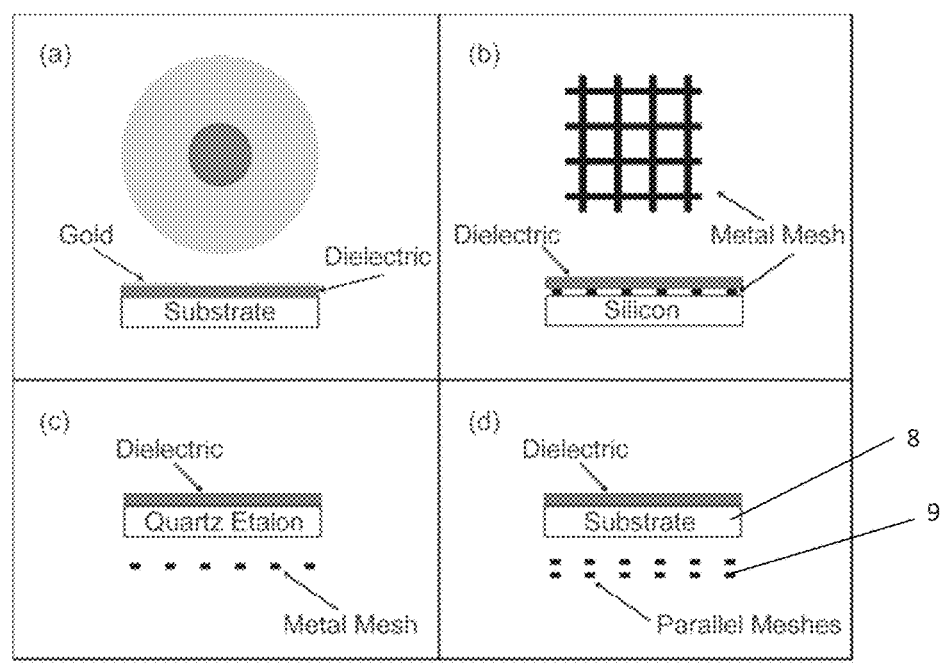
FIG. 2 is a schematic showing (a) a hybrid hole output coupler; (b) a hybrid metal mesh dielectric coupler; (c) a substrate étalon—metal mesh Fabry-Pérot coupler; and (d) a new parallel metal mesh Fabry-Pérot coupler with a separate dielectric coated substrate pump beam reflector.

In the new FIR laser 100, a pump beam reflector 8 and the FIR output coupler 9 are separate components as shown in FIGS. 2(d) and 3. The substrate of the pump beam reflector 8 is preferably a crystal quartz plate with the thickness chosen to have maximum transmission at the preferred wavelength of the FIR, while it is coated to provide >98% reflection for the pump laser, making it a dichroic mirror. The adjustment of the dichroic mirror 8 optimizes the pump beam absorption without compromising the FIR alignment. It is also used as the vacuum window, as shown in FIG. 3.

A parallel mesh Fabry-Pérot [15], depicted in FIG. 2(d), is used as the output coupler 9. As shown in FIG. 3, the output coupler 9 is installed outside the vacuum boundary of a chamber 20, making it very convenient to tune and align the laser.

In a working example, the new optically pumped FIR laser 100 utilizing HCOOH vapor and operating at 433 μm achieves a high laser gain of 3 dB/m and power conversion efficiency of 16.4% of the Manley-Rowe limit with the pump beam optimization by tuning a dichroic mirror 8 which reflects the pump beam. The variable parallel mesh coupler 9 enables the characterization of the laser gain and optimization of the coupling coefficient. The mesh coupler 9 is placed outsize the vacuum boundary of the chamber 20, making it very convenient to tune up the laser. Stable laser performance is achieved by choosing meshes with line density of ~120 to 150 lines per inch. The output laser beam has near Gaussian beam quality as expected.

The dichroic mirror 8 is preferably separated from the output coupler 9 as discussed above. Both the rear mirror 3 and the dichroic mirror 8 are mounted to the ends of first and second bellows 4 on opposite ends of the chamber 20 to allow angle adjustments. The output coupler 9 is mounted on a motorized translation stage 10 so that the cavity length can be adjusted for resonance, and for controlling the beat frequency between the two FIR lasers 100. Decoupling of the pump beam reflector from the FIR output coupler allows independent optimization of the pump laser beam absorption to maximize the FIR laser gain and power by adjusting the pump beam incident angle and the reflector (see 8 in FIG. 3), and the alignment/tuning of the FIR laser cavity by adjusting the rear mirror (see 3 in FIG. 3) and the output coupler (see 9 in FIG. 3).

Thus, an advantage of the new FIR laser 100 is that the decoupling of the pump beam reflector 8 from the FIR output coupler 9 allows the optimization of the pump laser beam absorption to maximize the FIR laser gain and power, as indicated in FIG. 3 and discussed above. Another advantage of the new FIR laser 100 is that the output coupler 9 is placed outside the vacuum boundary of the chamber 20 making it very convenient to tune and operate the laser 100. Also if a new wavelength of operation is desired and a new output coupler 9 needs to be used, a new coupler can be quickly swapped for the old coupler and the laser 100 retuned. Yet another advantage of the new FIR laser 100 is that the laser 100 takes full advantages of using a parallel mesh coupler, which includes the flexibility to optimize the laser operation and to measure the gain of the laser.

For different applications, different wavelengths of FIR laser beams are desired. It is quite easy to adapt the laser described herein (operating at a wavelength of 433 μm) to operate at other wavelengths. Three changes are required. First, change the lasing medium, i.e., fill the laser cavity using a different molecular gas; second, change the pump laser beam wavelength, which can be easily done if a grating tuned $CO_2$ laser is used as the pump source; and third, change the metal mesh of the output coupler.

Turning to FIG. 4, the FIR laser described herein can be used for high temperature plasma diagnostics. It can provide plasma electron density profiles and fluctuations, internal magnetic field structures, by interferometry and polarimetry. An example system 200 for far infrared laser polarimetry and far forward scattering diagnostics is depicted in FIG. 4. The system 200 includes a grating-tuned $CO_2$ laser (Coherent, model GEM Select-50) operating at a wavelength of 9.27 μm and a CW output power of ~60 W used as the pump source 201 for two FIR lasers 210 and 211 using formic acid (HCOOH) vapor and operating at a wavelength of 433 μm [7]. The FIR1 and FIR2 laser beams are linearly polarized in the same direction. A half-wave plate (WP1) rotates the FIR1 polarization by 90°, so that both FIR beams can be combined to propagate co-linearly by the polarizer (P). A quarter-wave plate (WP2) then converts the two perpendicularly linearly polarized FIR beams into right-hand and left-hand circularly polarized beams, respectively. Partial power of the combined FIR beams is focused onto and detected by the reference mixer (Ref). The remaining FIR laser is split into two beams to probe the plasma, which propagate across the C-2 confinement vessel with impact parameters of 20.3 and 30.5 cm, respectively, and then be detected by two signal mixers (SM1 and SM2). The FIR chords are preferable aligned perpendicular to the machine axis and equilibrium poloidal magnetic field, while toroidal (azimuthal) magnetic field will be projected along the chord direction and will be detected by Faraday rotation measurements. The chords are 8.3 cm away axially from the midplane, parallel to the chords of the two-color interferometer. Therefore, the density profile measured by the interferometer can be directly used for the interpretation of the polarimetry data. All lasers (FIR1 and FIR2), beam combining polarizer (P), wave-plates (WP1 and WP2), and the reference mixer (Ref) and related components including mirrors (M), beam splitters (BS) and lenses (L) are installed on a non-magnetic 3 feet by 10 feet optical table 220, supported by 4 Newport S-2000A vibration isolators. The lens L1 and the turning mirror (M) before it are supported by a structure aluminum attached to the optical table. The beam splitter (BS), mirrors (M), lenses (L), and signal mixers (SM1 and SM2) are mounted on two separate aluminum structures attached to each arm of the U-shaped support of the two-color interferometer.

Other applications include satellite remote sensing, concealed weapon detection, and near field microscopy imaging for characterization of nano and semiconductor devices, etc.

LIST OF REFERENCES

1. N. C. Luhmann, Jr. and W. A. Peebles, Rev. Sci. Instrum., 55 (3), 279 (1984).
2. D. Véron, Submillimeter Interferometry of High Density Plasmas, in Infrared and Millimeter Waves, Vol. 2, Chap. 2, edited by K. J. Button (Academic, New York, 1979).
3. B. S. Williams, Nature Photonics, 1(9), 517 (2007).
4. R. M. Erickson, Far-Infrared Polarimetry/Interferometry for Poloidal Magnetic Field Measurement on ZT-40M, Thesis, Los Alamos, LA-10731-T, (1986).
5. J. H. Rommers and J. Howard, Plasma Phys. Controlled Fusion 38, 1805 (1996).
6. B. H. Deng, et al., Rev. Sci. Instrum., 74 (3), 1617 (2003).
7. B. H. Deng, et al., Rev. Sci. Instrum., 77 (3), 10F108 (2006).
8. W. F. Bergerson, et al., Rev. Sci. Instrum., 83 (3), 10E316 (2012).
9. D. K. Mansfield, at al., Appl. Opt. 26, 4469 (1987).
10. T. Y. Chang, IEEE Trans. Microwave Theory and Techniques, MTT-22 (12), 983 (1974).
11. D. K. Mansfield, E. Horlbeck, C. L. Bennett, and R. Chouinard, Int. J. Infrared Millimeter Waves 6, 867 (1985).
12. E. J. Danielewicz, T. K. Plant, and T. A. DeTemple, Opt. Commun. 13 (4), 366 (1975).
13. T. Lehecka, et al., Rev. Sci. Instrum., 57 (8), 1986 (1986).
14. L. D. Fesenko and S. F. Dyubko, Soy. J. Quantum Electron., 6 (7), 839 (1976).
15. R. Ulrich, T. J. Bridges, and M. A. Pollack, Appl. Opt., 9 (11), 2511 (1970).
16. L. B. Whitbourn et al., Infrared Phys., 28 (1), 7 (1988).
17. S. F. Dyubko, L. D. Fesenko, and O. I. Baskakov, Soy. J. Quantum Electron., 7 (7), 859 (1977).
18. D. Ford, email communication from Ophir-Spiricon, November 2, (2011).
19. M. Naftaly, R. E. Miles, and P. J. Greenslade, proceedings of the joint 32nd international conference on infrared and millimeter waves and 15th international conference on terahertz electronics, IRMMW-THz 2007, Sep. 2-9, 2007, 819, (2007).
20. J. M. Manley and H. E. Rowe, Proceedings of the IRE, 44(7), 904, (1956).
21. E. A. J. Marcatili and R. A. Schmeltzer, Bell Syst. Tech. J., 43, 1783, (1964).

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

In the description above, for purposes of explanation only, specific nomenclature is set forth to provide a thorough understanding of the present disclosure. However, it will be apparent to one skilled in the art that these specific details are not required to practice the teachings of the present disclosure.

The various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter.

It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art. For example, the reader is to understand that the specific ordering and combination of process actions described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed:

1. A FIR laser comprises
   a vacuum chamber,
   a beam pump source coupled to the chamber,
   a rear mirror with an off center hole,
   a waveguide, wherein the rear mirror and waveguide are housed in the chamber,
   a pump beam reflector coupled to the chamber opposite the rear mirror, and
   an output coupler positioned external to the chamber, wherein the distance between the rear mirror and output coupler define the cavity length of the FIR laser.

2. The FIR laser of claim 1, further comprising a vacuum window coupled to the chamber adjacent the rear mirror.

3. The FIR laser of claim 1, wherein a beam output from the pump source is split into two beams to pump two identical FIR lasers.

4. The FIR laser of claim 1, wherein the pump beam reflector and the output coupler are separate components.

5. The FIR laser of claim 1, wherein the pump beam reflector is configured as a dichroic mirror and positioned on an output end of the chamber separated from the output coupler.

6. The FIR laser of claim 1, wherein the rear mirror and the pump beam reflector are mounted to the ends of first and second bellows on opposite ends of the chamber.

7. The FIR laser of claim 6, wherein the bellows allow angle adjustments between the rear mirror and the pump beam reflector.

8. The FIR laser of claim 1, wherein the output coupler is movable to enable the cavity length to be adjusted for resonance.

9. The FIR laser of claim 3, wherein the output coupler is movable to enable the cavity length to be adjusted for controlling a beat frequency between the two FIR lasers.

10. The FIR laser of claim 1, wherein the pump beam reflector is configured as a vacuum window on the output end of the chamber.

11. The FIR laser of claim 1, wherein the output coupler comprises a parallel mesh Fabry-Pérot.

* * * * *